US008051151B2

(12) United States Patent
Shannon et al.

(10) Patent No.: US 8,051,151 B2
(45) Date of Patent: Nov. 1, 2011

(54) SYSTEM AND METHOD FOR COMMUNICATING WITH A NETWORK NODE BEHIND A SUBSCRIBER STATION WITH AN IP CONVERGENCE SUB-LAYER

(75) Inventors: Michael L. Shannon, San Jose, CA (US); Jayaraman R. Iyer, Sunnyvale, CA (US); Anand K. Oswal, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1447 days.

(21) Appl. No.: 11/456,647

(22) Filed: Jul. 11, 2006

(65) Prior Publication Data

US 2008/0014955 A1     Jan. 17, 2008

(51) Int. Cl.
*G06F 15/177* (2006.01)
*G06F 15/173* (2006.01)
*H04L 9/00* (2006.01)
*H04K 1/00* (2006.01)
*H04W 4/00* (2009.01)

(52) U.S. Cl. .......... 709/221; 709/223; 380/44; 380/270; 370/338

(58) Field of Classification Search ........... 709/220–222
See application file for complete search history.

(56) References Cited

U.S. PATENT DOCUMENTS

| 6,778,528 | B1* | 8/2004 | Blair et al. | 370/352 |
|---|---|---|---|---|
| 6,845,094 | B1* | 1/2005 | Zhang | 370/349 |
| 6,907,048 | B1 | 6/2005 | Treadaway et al. | 370/474 |
| 7,002,941 | B1 | 2/2006 | Treadaway et al. | 370/338 |
| 7,042,905 | B1 | 5/2006 | Johnson | 370/468 |
| 2005/0265360 | A1* | 12/2005 | Kim et al. | 370/400 |
| 2006/0075140 | A1* | 4/2006 | Sobel et al. | 709/245 |
| 2006/0200543 | A1* | 9/2006 | Kong et al. | 709/223 |
| 2007/0047491 | A1* | 3/2007 | Dutta et al. | 370/331 |
| 2007/0297611 | A1* | 12/2007 | Yun et al. | 380/270 |
| 2008/0037478 | A1* | 2/2008 | Na et al. | 370/338 |

OTHER PUBLICATIONS

WiMAX Forum, *IEEE 802.16a Standard and WiMAX Igniting Broadband Wireless Access*, White Paper, *Worldwide Interoperability for Microwave Access Forum*, Date Unknown, 7 pgs. (can be found at http://www.wimaxforum.org/news/downloads/WiMAXWhitepaper.pdf.
Carl Eklund et al., "IEEE Standard 802.16: A Technical Overview of the WirelessMAN™ Air Interface for Broadband Wireless Access," *IEEE Communications Magazine*, Jun. 2002, pp. 98-107.

(Continued)

*Primary Examiner* — Ashok Patel
*Assistant Examiner* — Evans Desrosiers
(74) *Attorney, Agent, or Firm* — Baker Botts L.L.P.

(57) ABSTRACT

A system and method for providing service in a network having a wireless component is disclosed. The system and method comprise receiving a request for a dynamic address from a user node connected to a subscriber station having a convergence sub-layer, providing the dynamic address to the user node, associating the dynamic address with a service flow associated with the subscriber station, and sending data addressed to the dynamic address through the service flow. The dynamic address is based on a subscriber identifier associated with the subscriber station and a client identifier associated with the user node.

26 Claims, 2 Drawing Sheets

OTHER PUBLICATIONS

*802.16™ IEEE Standard for Local and metropolitan area networks—Part 16: Air Interface for Fixed Broadband Wireless Access Systems, IEEE*, Oct. 1, 2004, 857 pages.

Parviz Yegani, *WiMAX Overview* Presentation, IETF-64 Vancouver, Canada, *Cisco Systems, Inc.*, Nov. 7-11, 2005, 22 pages (available at http://www3.ietf.org/proceedings/05nov/slides/16ng-4.pdf).

Max Riegel, *WiMAX Network Architecture, Siemens*, Dec. 2, 2005; 54 pages, available at http://www.max.franken.de/051202-wimax-network-architecture.pdf.

*Mobile WiMAX—Part 1: A Technical Overview and Performance Evaluation, WiMAX Forum*, Jun. 2006, 53 pages, available at http://www.wimaxforum.org/news/downloads/Mobile_wiMAX_Part1_Overview_and_Performance.pdf..

Kuo-Hui Li, *WiMAX Network Architecture*, Presentation, WiMAX Solutions Division *Intel Mobility Group*, Jun. 5, 2006, 17 pgs., available at http://santos.ee.ntu.edu.tw/mobile/Speech/WiMAX%20Network%20Architecture.pdf.

\* cited by examiner

SYSTEM AND METHOD FOR COMMUNICATING WITH A NETWORK NODE BEHIND A SUBSCRIBER STATION WITH AN IP CONVERGENCE SUB-LAYER

TECHNICAL FIELD OF THE INVENTION

This invention relates in general to communications, and more particularly to a system and method for communicating with a network node behind a subscriber station having IP convergence.

BACKGROUND OF THE INVENTION

As the demand increases for broadband access to data networks, conventional dial-up, DSL, and other broadband systems have proven inadequate. A significant limitation of these conventional systems is the cost of building and extending the network infrastructure. In particular, these systems generally are restricted by their dependency on cables as a transport medium, and the cost associated with laying new cable.

Wireless broadband networks, however, eliminate or substantially reduce many of the physical limitations of conventional systems. Consequently, many network operators and service providers are turning to these types of networks to serve their consumers. Wireless broadband network architectures such as Wi-Fi and WiMax have emerged as industry standards, and continue to evolve at a rapid pace.

Part of this evolution stems from a need for wireless networks to operate seamlessly with conventional wired infrastructure, particularly with existing packet-switched networks. Many wireless access systems currently use native Ethernet to identify network nodes. Recent standards, though, define an IP convergence sub-layer that enables native IP operation and no longer use Ethernet frames. These new standards with an IP convergence sub-layer present a problem for applications that need to identify nodes connected behind wireless access nodes that implement an IP convergence sub-layer. Applications that require a certain Quality of Service (QoS) or policy-based access, for example, are particularly difficult to implement without uniquely identifying each node.

SUMMARY OF THE INVENTION

In accordance with the present invention, the disadvantages and problems associated with identifying network nodes in a broadband wireless access network have been substantially reduced or eliminated. In particular, the present invention facilitates identifying and communicating with network nodes connected to access nodes, such as a subscriber station, that implement an IP convergence sub-layer.

In accordance with one embodiment of the present invention, a method provides service in a network having a wireless component. The method comprises receiving a request for a dynamic address from a user node connected to a subscriber station having a convergence sub-layer, providing the dynamic address to the user node, associating the dynamic address with a service flow associated with the subscriber station, and sending data addressed to the dynamic address through the service flow. The dynamic address is based on a subscriber identifier associated with the subscriber station and a client identifier associated with the user node.

In accordance with another embodiment of the present invention, a system provides service in a network. The system comprises a processor and an interface for connecting to a user node through a subscriber station having a convergence sub-layer. The processor is operable to receive a request for a dynamic address from the user node, provide the dynamic address to the user node, associate the dynamic address with a service flow associated with the subscriber station, and send data addressed to the dynamic address through the service flow. The dynamic address is based on a subscriber identifier associated with the subscriber station and a client identifier associated with the user node.

Important technical advantages of certain embodiments of the present invention include supporting multiple user nodes behind a subscriber station with an IP convergence sub-layer, and providing different QoS to each user node.

Another important technical advantage of certain embodiments of the present invention includes facilitating interoperability between broadband wireless access networks and service networks, including the Internet.

Other technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

The principles of the present invention may be implemented in a variety of hardware and software configurations. As is commonly understood in the art, the structure for implementing the functions described below may comprise any appropriately configured data processing hardware, software, process, algorithm, or combination thereof. Each function may be implemented in a single physical device or may be distributed over multiple physical devices.

Software and data structures associated with certain aspects typically are stored in a memory, which may be coupled to a functional element directly or remotely through a network. The term "memory," as used herein, includes without limitation any volatile or persistent medium, such as an electrical circuit, magnetic disk, or optical disk, in which a data or software may be stored for any duration. A single memory may encompass and be distributed across a plurality of media.

Additionally, certain embodiments are described below with reference to an exemplary network of functional elements. Each such functional element may represent a hardware device, software, process, or any combination thereof. A "network" comprises any number of these functional elements coupled to and in communication with each other through a communications medium. A "communications medium" includes without limitation any conductive, optical, electromagnetic, or other medium through which a functional element can transmit data. Unless otherwise indicated in context below, all network nodes may use publicly available protocols or messaging services to exchange signals, messages, and other forms of electronic communication with each other through a network.

Figure 1:
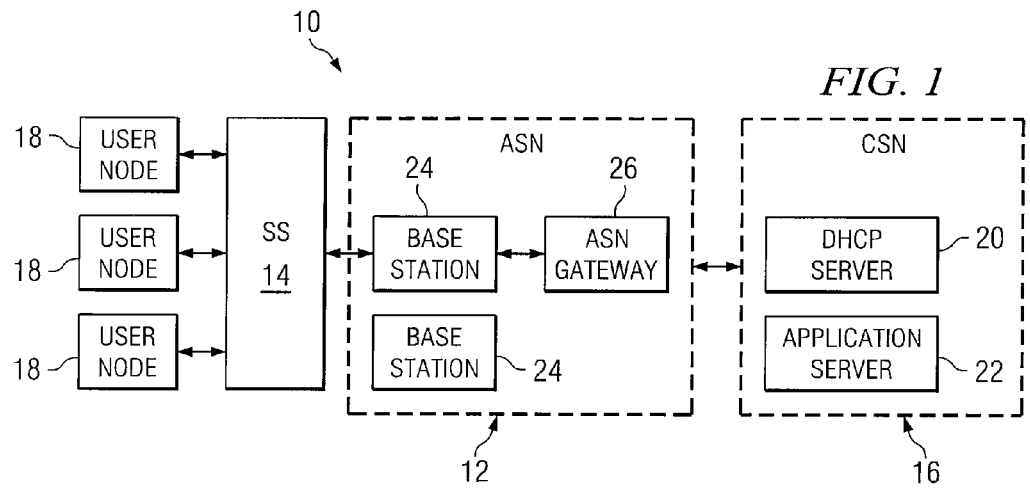
FIG. 1 is a simplified block diagram of a network architecture in which the present invention may operate.

FIG. 1 is a simplified diagram of a network architecture in which the present invention may operate. Network 10 comprises an access service network (ASN) 12 coupled to a subscriber station 14 and a core service network (CSN) 16. Subscriber station 14 is coupled to one or more user nodes 18.

CSN 16 represents any packet-switched network, circuit-switched network, or both. CSN 16 also may be referred to as a "connectivity service network." Moreover, core service network 16 may represent the Internet or may be connected to the Internet. Core service network 16 also may include address server 20 and application server 22 (e.g., a web server).

ASN 12 represents functional elements and other infrastructure for providing connectivity between a wireless interface and CSN 16. As FIG. 1 illustrates, ASN 12 may comprise one or more base stations 24 and ASN gateway (ASN GW) 26. As noted above, however, the functions of base stations 24 and ASN GW 26 may be implemented in a single physical device or distributed across multiple devices in certain embodiments. Base stations 24 generally are connected physically to an antenna (not pictured) that transmits and receives radio signals to and from subscriber station 14.

Functional elements within ASN 12, including base station 24 and ASN GW 26 may be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to perform the functions thereof. Considerable flexibility is provided by these functional elements and, accordingly, should be construed as such.

Subscriber station (SS) 14 represents any functional element that provides access connectivity to ASN 12, typically through an air interface with a base station 20. A subscriber station also may be known as a "mobile subscriber station" or "customer premises equipment (CPE)." SS 14 further comprises a service interface that provides service connectivity to user nodes 18.

User nodes 18 represent any functional element operable to connect to SS 14 through the service interface. Although user node 18 is typically an end-user element, it may alternatively be any intermediate or server element connected to SS 14 through the service interface. User nodes 18 may connect to SS 14 through a wired or wireless connection. Examples of user nodes 18 include, without limitation, portable computers, desktop computers, personal digital assistants (PDAs), and wireless telephones.

Certain embodiments of the invention are described below with reference to an air interface between SS 14 and ASN 12 that conforms to or is compatible with the set of standards published by IEEE and known as the 802.16 standards for wireless metropolitan area networks (commonly known as "WiMax"). The principles described, however, are applicable to any air interface having a connection-oriented paradigm with a network convergence sub-layer. Thus, the following overview of WiMax is provided only as a context for teaching and describing certain principles of the invention. It is not intended to limit the scope of the invention.

The WiMax standard specifies the protocols and behavior of the physical and media access control (MAC) layers of the interface. The MAC includes service-specific convergence sub-layers that interface to higher layers, above the core MAC common part sub-layer. Below the common part sub-layer is the privacy sub-layer.

In general, the WiMax MAC is designed to support a point-to-multipoint architecture with a central base station handling multiple independent subscriber stations simultaneously. Moreover, the MAC is connection-oriented. All services, including inherently connectionless services, are mapped to a connection. This connection-oriented paradigm provides a mechanism for requesting bandwidth, associating QoS and traffic parameters, transporting and routing data to the appropriate convergence sub-layer, and all other actions associated with providing service. Connections are referenced with 16-bit connection identifiers (CIDs) and may require continuously granted bandwidth or bandwidth on demand.

Each subscriber station has a unique identifier (usually a standard 48-bit MAC address), and is allocated connections as needed to provide service. Connections generally are unidirectional to facilitate different uplink and downlink QoS and traffic parameters, and are usually allocated in pairs. WiMax uses the concept of a "service flow" to define unidirectional transport of packets on either downlink or uplink. Service flows are characterized by a set of QoS parameters such as latency and jitter. Each admitted or active service flow is mapped to a MAC connection with a unique CID. In general, a service flow may be pre-provisioned or dynamically created. Nodes in the access network, such as ASN GW 26, or subscriber stations may initiate service flow creation. Each service flow has a service flow identifier (SFID), which has a one-to-one correlation with a CID. A unique identifier also is given to each service flow between BS 24 and ASN GW 26.

Figure 2:
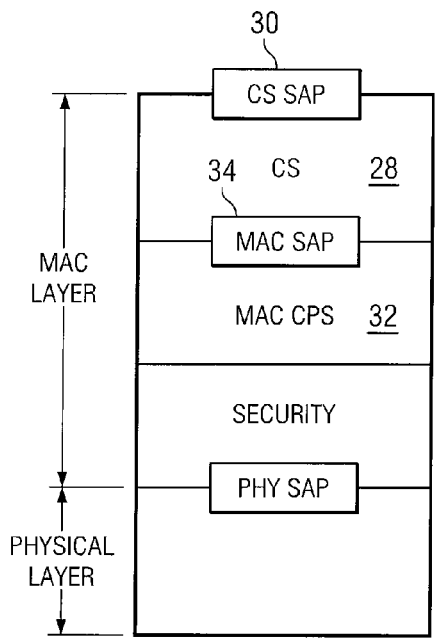
FIG. 2 is a simplified block diagram of the layers defined by the WiMax standard.

FIG. 2 is a simplified diagram of the layers defined by the WiMax standard. According to the current standard, the MAC layer comprises three sub-layers. The Service-Specific Convergence Sub-layer (CS) 28 provides any transformation or mapping of external network data received through a CS Service Access Point (SAP) 30 into MAC Service Data Units (SDUs). The scope of the CS includes classifying external SDUs and associating them with a particular service flow and connection. The standard provides for multiple CS specifications for interfacing with various protocols. The MAC Common Part Sub-layer (CPS) 32 receives MAC SDUs from CS 28 through MAC SAP 34, but is not required to understand the format or parse any information from the CS payload.

Current WiMax standards, however, provide no mechanism for managing communications between access service networks and multiple user nodes connected behind a subscriber station. Moreover, the convergence sub-layers that map external SDUs to specific connections may also significantly impede the identification of specific user nodes behind a subscriber station.

In accordance with certain teachings of the invention, however, functional elements within an access service network are able to uniquely identify user nodes and, hence, provide varying QoS levels to each user node.

Figure 3:
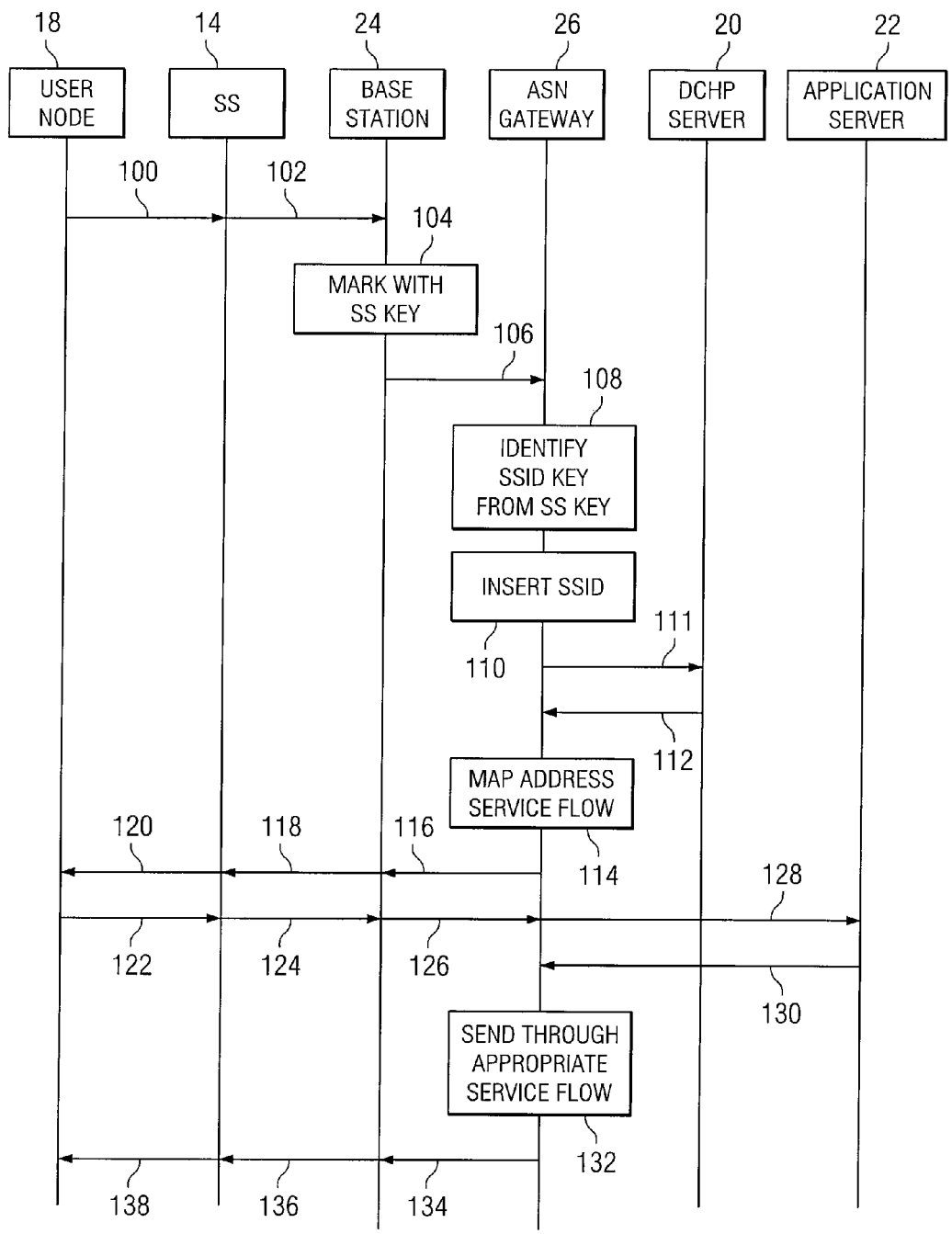
FIG. 3 is a sequence diagram that illustrates an example operation of the invention.

FIG. 3 is a sequence diagram that illustrates an example operation of the invention. This sequence is based on a presumption that SS 14 has undergone initial network entry, has successfully been authenticated (if necessary) and established a basic transport connection to ASN 12 and CSN 16. During these preliminary processes, ASN GW 26 associates SS 14 with a unique key (referred to herein as an "SS key"). In one embodiment of the invention, an SS key is the type of key specified in the Generic Routing Encapsulation (GRE) protocol, but any key used in conjunction with a protocol that encapsulates other SDUs may be substituted. BS 24 marks all uplink packets with the SS key.

In step 100, user node 18 sends a request for a dynamic address. The request includes a client identifier, which uniquely identifies user node 18. The client identifier may be an Ethernet MAC address or any other type of number, address, tag, label, mark, or other identifier suitable for the purpose of uniquely identifying a node. SS 14 receives the request and forwards it to BS 24 (step 102).

BS 24 then marks the request with the appropriate SS key associated with SS 14 (step 104). BS 24 next sends the request (with the SS key inserted) to ASN GW 26 (step 106).

As described in greater detail below, ASN GW 26 maintains an association between SS keys and subscriber stations connected to base stations. Thus, ASN GW 26 uses the SS key to identify SS 14 (step 108). SS 14 may be identified by a unique subscriber station identifier (SSID), MAC address, or any other suitable number, tag, label, mark, or the like. In the example illustrated in FIG. 3, ASN GW 26 uses an SSID, and inserts the SSID into the request (step 110). In this example, ASN GW 26 relays the request to address server 20 (step 111), but in alternative embodiments, ASN GW 26 may process the request internally. Thus, either address server 20 or ASN GW 26 may provide a dynamic address.

As FIG. 3 illustrates, one embodiment of address server 20 is a server that implements an address allocation protocol known as the Dynamic Host Configuration Protocol (DHCP). In an embodiment that implements DHCP (in either ASN GW 26 or address server 20), the request also should comply with or be compatible with DHCP requirements. Moreover, if the request is a DHCP request, ASN GW 26 may insert the SSID into an optional DHCP field, such as a field known as a "relay agent information" field. The relay agent information field also is known as "option 82," and may include sub-fields. Thus, ASN GW 26 may insert the SSID into a sub-field, such as a field known as the "remote identifier" field.

In step 112, ASN GW 26 receives a response from address server 20 with a dynamic address allocated to user node 18 (alternatively, ASN GW 26 may allocate the address). In step 114, ASN GW 26 associates the dynamic address with a service flow to SS 14. The association may be any type of link, map, pairing, coupling, or relationship between the dynamic address and the service flow, which may be represented by an SFID, SSID, CID, or other unique key. ASN GW 26 then forwards the response to user node 18 (steps 116-120).

Subsequently, user node 18 may send a request (an HTTP request for example) to application server 22 (steps 122-128). This request includes the dynamic address allocated to user node 18. Application server 22 represents any application layer service, such as an HTTP server, FTP server, or SIP server. ASN GW 26 then receives a response from application server 22 (step 130). This response also includes the dynamic address allocated to user node 18. Accordingly, ASN GW 26 matches the dynamic address with the associated service flow (step 132), and sends the response to user node 18 over the associated service flow (steps 134-138).

Figure 4:
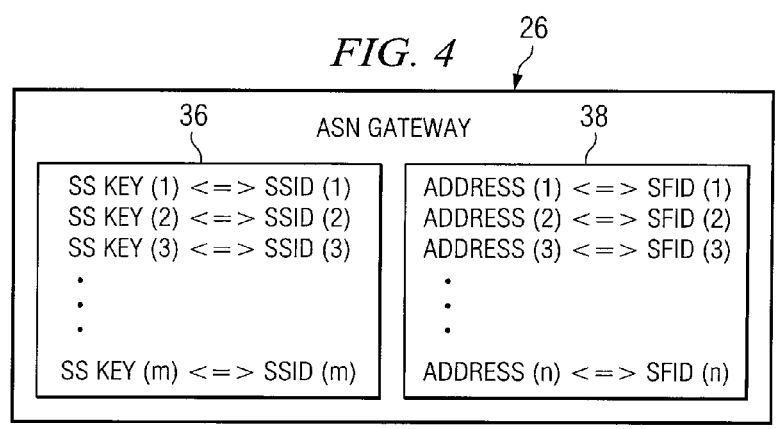
FIG. 4 is a simplified block diagram of one embodiment of an ASN GW.

FIG. 4 is a simplified block diagram of one embodiment of ASN GW 26 that implements certain teachings of the invention. More particularly, FIG. 4 illustrates one structure associated with the function of associating SS keys with subscriber stations and identifying a subscriber station from an SS key. In the embodiment illustrated in FIG. 4, ASN GW 26 includes SS map 36 and user node map 38. SS map 36 and user node map 38 each represent a data structure in a memory 40 accessible to ASN GW 26. Such data structures may include simple tables, arrays, linked lists, flat databases, relational databases, or any other structure convenient for mapping or pairing information. SS map 36 and user node map 38 may be implemented in a single data structure or distributed across multiple data structures (as illustrated in FIG. 4).

If certain user nodes 18 have differential QoS requirements, ASN GW 26 may create additional service flows to accommodate these requirements. Each user node 18 requiring a different QoS may request a dynamic address as described above. ASN GW 26 then associates each dynamic address to a different service flow as needed to satisfy the QoS requirements. Moreover, ASN GW 26 may periodically communicate these associations to SS 14, so that SS 14 may properly classify messages originating from user nodes 18 and send them over the appropriate service flow.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for providing service in a network having a wireless component, the method comprising:
   receiving a request for a dynamic address from a user node connected to a subscriber station having a IP convergence sub-layer, the request comprising a client identifier associated with the user node;
   inserting a key associated with the subscriber station;
   determining a subscriber identifier associated with the subscriber station from the key;
   determining the dynamic address for the user node using the subscriber identifier;
   associating the dynamic address with the subscriber identifier and with the client identifier;
   associating the dynamic address with a service flow associated with the user node; and
   sending data addressed to the dynamic address through the service flow.

2. The method of claim 1, further comprising:
   associating a second service flow with the user node, and wherein the dynamic address is associated with the second service flow so that the data is sent through the second service flow.

3. The method of claim 1, wherein the request is a dynamic host configuration protocol (DHCP) message encapsulated in a generic routing encapsulation (GRE) protocol message.

4. The method of claim 1, wherein the request is a dynamic host configuration protocol (DHCP) message encapsulated in a generic routing encapsulation (GRE) protocol message, and wherein inserting the subscriber identifier associated with the key into the request comprises inserting the subscriber identifier associated with the key into an optional field of the DHCP message.

5. The method of claim 1, wherein the request is a dynamic host configuration protocol (DHCP) message encapsulated in a generic routing encapsulation (GRE) protocol message, and wherein inserting the subscriber identifier associated with the key into the request comprises inserting the subscriber identifier associated with the key into an optional relay agent information field of the DHCP message.

6. The method of claim 1, wherein the request is a dynamic host configuration protocol (DHCP) message encapsulated in a generic routing encapsulation (GRE) protocol message, and wherein inserting the subscriber identifier associated with the key into the request comprises inserting the subscriber identifier associated with the key into a remote identifier sub-field of an optional relay agent information field of the DHCP message.

7. The method of claim 1, wherein the client identifier is a media access control (MAC) address.

8. The method of claim 1, wherein determining the dynamic address comprises forwarding the request to a server that allocates the dynamic address, receiving a response having the dynamic address from the server, and forwarding the response to the user node.

9. The method of claim 1, wherein the client identifier is a media access control (MAC) address; wherein the request is a dynamic host configuration protocol (DHCP) message encapsulated in a generic routing encapsulation (GRE) protocol message; wherein inserting the subscriber identifier associated with the key into the request comprises inserting the subscriber identifier associated with the key into an optional relay agent information field of the DHCP message; and wherein determining the dynamic address comprises forwarding the request to a server that allocates the dynamic address, receiving a response having the dynamic address from the server, and forwarding the response to the user node, further comprising associating a second service flow with the user node, and wherein the dynamic address is associated with the second service flow so that the data is sent through the second service flow.

10. The method of claim 1, wherein the key and the subscriber identifier comprise the same identifier.

11. The method of claim 1, further comprising:
associating a second dynamic address with the subscriber identifier and with a second client identifier associated with a second user node coupled to the subscriber station;
associating the second dynamic address with a second service flow associated with the second user node; and
sending data addressed to the second dynamic address through the second service flow.

12. A system for providing service in a network, the system comprising:
an interface for connecting to a user node through a subscriber station having a IP convergence sub-layer; and
at least one processor operable to:
receive a request for a dynamic address from the user node, the request comprising a client identifier associated with the user node;
insert a key associated with the subscriber station;
determine a subscriber identifier associated with the subscriber station from the key;
determine the dynamic address for the user node using the subscriber identifier;
associate the dynamic address with the subscriber identifier and with the client identifier;
associate the dynamic address with a service flow associated with the user node; and
send data addressed to the dynamic address through the service flow.

13. The system of claim 12, wherein the processor is further operable to associate a second service flow with the user node, and wherein the dynamic address is associated with the second service flow so that the data is sent through the second service flow.

14. The system of claim 12, wherein the request is a dynamic host configuration protocol (DHCP) message encapsulated in a generic routing encapsulation (GRE) protocol message, and wherein inserting the subscriber identifier associated with the key into the request comprises inserting the subscriber identifier associated with the key into an optional field of the DHCP message.

15. The system of claim 12, wherein the request is a dynamic host configuration protocol (DHCP) message encapsulated in a generic routing encapsulation (GRE) protocol.

16. The system of claim 12, wherein the key and the subscriber identifier comprise the same identifier.

17. The system of claim 12, wherein the at least one processor is further operable to:
associate a second dynamic address with the subscriber identifier and with a second client identifier associated with a second user node coupled to the subscriber station;
associate the second dynamic address with a second service flow associated with the second user node; and
send data addressed to the second dynamic address through the second service flow.

18. Software for providing services in network, the software being embodied in at least one computer-readable memory comprising computer code such that when executed is operable to:
receive a request for a dynamic address from a user node connected to a subscriber station having a IP convergence sub-layer, the request comprising a client identifier associated with the user node;
insert a key associated with the subscriber station;
determine a subscriber identifier associated with the subscriber station from the key;
determine the dynamic address for the user node using the subscriber identifier;
associating the dynamic address with the subscriber identifier and with the client identifier;
associate the dynamic address with a service flow associated with the user node; and
send data addressed to the dynamic address through the service flow.

19. The software of claim 18, wherein the computer code is further operable to associate a second service flow with the user node, and wherein the dynamic address is associated with the second service flow so that the data is sent through the second service flow.

20. The software of claim 18, wherein the request is a dynamic host configuration protocol (DHCP) message encapsulated in a generic routing encapsulation (GRE) protocol message, and wherein inserting the subscriber identifier associated with the key into the request comprises inserting the subscriber identifier associated with the key into an optional field of the DHCP message.

21. The software of claim 18, wherein the request is a dynamic host configuration protocol (DHCP) message encapsulated in a generic routing encapsulation (GRE) protocol message, and wherein inserting the subscriber identifier associated with the key into the request.

22. The software of claim 18, wherein the key and the subscriber identifier comprise the same identifier.

23. The software of claim 18, wherein the computer code is further operable to:
associate a second dynamic address with the subscriber identifier and with a second client identifier associated with a second user node coupled to the subscriber station;
associate the second dynamic address with a second service flow associated with the second user node; and
send data addressed to the second dynamic address through the second service flow.

24. A system for providing services in a network, the system comprising:
- means for connecting to a user node through a subscriber station having a IP convergence sub-layer;
- means for receiving a request for a dynamic address from the user node, the request comprising a client identifier associated with the user node;
- means for inserting a key associated with the subscriber station;
- means for determining a dynamic address for the user node using a subscriber identifier associated with the subscriber station, the subscriber identifier associated with the key;
- means for associating the dynamic address with the subscriber identifier and with the client identifier;
- means for associating the dynamic address with a service flow associated with the subscriber station.

25. The system of claim 24, further comprising means for associating a second service flow with the user node to provide a predetermined quality of service to the user node.

26. The system of claim 24, further comprising:
- means for associating a second dynamic address with the subscriber identifier and with a second client identifier associated with a second user node coupled to the subscriber station;
- means for associating the second dynamic address with a second service flow associated with the second user node; and
- means for sending data addressed to the second dynamic address through the second service flow.

* * * * *